United States Patent
Bertosa et al.

(10) Patent No.: US 9,292,977 B2
(45) Date of Patent: Mar. 22, 2016

(54) METHOD AND APPARATUS FOR IDENTIFYING RELATED FIX INFORMATION AND PARTS NUMBER

(71) Applicant: Bosch Automotive Service Solutions LLC, Warren, MI (US)

(72) Inventors: Thomas Bertosa, Chardon, OH (US); Michael Gessner, Akron, OH (US); James Fish, Birmingham, OH (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 0 days.

(21) Appl. No.: 14/095,482

(22) Filed: Dec. 3, 2013

(65) Prior Publication Data

US 2014/0088818 A1 Mar. 27, 2014

Related U.S. Application Data

(63) Continuation of application No. 13/195,386, filed on Aug. 1, 2011, now Pat. No. 8,600,610, which is a continuation-in-part of application No. 12/986,559, filed on Jan. 7, 2011, now Pat. No. 8,788,137.

(60) Provisional application No. 61/319,602, filed on Mar. 31, 2010.

(51) Int. Cl.
*G01M 17/00* (2006.01)
*G07C 5/00* (2006.01)
*G06Q 30/06* (2012.01)

(52) U.S. Cl.
CPC ............ *G07C 5/008* (2013.01); *G06Q 30/0639* (2013.01)

(58) Field of Classification Search
USPC .............................. 701/29.1, 31.4, 31.5, 31.6
See application file for complete search history.

(56) References Cited

U.S. PATENT DOCUMENTS

| | | |
|---|---|---|
| 4,757,463 A | 7/1988 | Bllou et al. |
| 6,181,992 B1 | 1/2001 | Gurne et al. |
| 6,229,536 B1 | 5/2001 | Alexander et al. |
| 6,941,203 B2 | 9/2005 | Chen |
| 7,555,376 B2 | 6/2009 | Beronja |
| 7,734,390 B2 | 6/2010 | Chen |
| 7,809,482 B2 | 10/2010 | Bertosa et al. |
| 7,962,271 B1 | 6/2011 | Thompson et al. |
| 7,970,722 B1 | 6/2011 | Owen et al. |

(Continued)

FOREIGN PATENT DOCUMENTS

| | | |
|---|---|---|
| CA | 2 506 472 A1 | 11/2006 |
| EP | 1953617 A2 | 8/2008 |
| KR | 1020030051239 A | 6/2003 |

OTHER PUBLICATIONS

Search Report for EP 11180597.8, mailed Aug. 5, 2011 (Previously presented with the parent U.S. Appl. No. 13/195,386).

(Continued)

*Primary Examiner* — Michael D Lang
(74) *Attorney, Agent, or Firm* — Baker & Hostetler LLP (57) ABSTRACT

A diagnostic tool and method are provided wherein a faulty part and its part number is determined based on a retrieved DTC for a specific vehicle. The part number may include the original manufacturer's number and a generic equivalent manufacturer's number (if available). The diagnostic tool can search a parts database of various parts suppliers for their pricing and location. The diagnostic tool can also provide suggested fixes to the user based on the retrieved DTC.

18 Claims, 9 Drawing Sheets

(56) References Cited

U.S. PATENT DOCUMENTS

| | | | |
|---|---|---|---|
| 7,996,128 B2 | 8/2011 | Bertosa et al. | |
| 2002/0007237 A1 | 1/2002 | Phung et al. | |
| 2002/0077779 A1 | 6/2002 | Liebl et al. | |
| 2003/0138475 A1* | 7/2003 | Chen | 424/435 |
| 2004/0205534 A1 | 10/2004 | Koelle | |
| 2005/0065678 A1 | 3/2005 | Smith et al. | |
| 2006/0047617 A1 | 3/2006 | Bacioiu et al. | |
| 2006/0123692 A1* | 6/2006 | Beronja | 43/61 |
| 2006/0178791 A1 | 8/2006 | Fountain et al. | |
| 2007/0050105 A1 | 3/2007 | Chinnadurai et al. | |
| 2007/0088465 A1 | 4/2007 | Heffington | |
| 2007/0156311 A1 | 7/2007 | Elcock et al. | |
| 2008/0065289 A1 | 3/2008 | Bertosa et al. | |
| 2008/0140281 A1 | 6/2008 | Morris et al. | |
| 2008/0270075 A1 | 10/2008 | Bertosa et al. | |
| 2009/0271062 A1 | 10/2009 | Grenn | |
| 2009/0276115 A1* | 11/2009 | Chen | 701/32 |
| 2009/0300548 A1 | 12/2009 | Sullivan et al. | |
| 2009/0305732 A1 | 12/2009 | Marcellino et al. | |
| 2010/0106359 A1 | 4/2010 | Underdal et al. | |
| 2010/0127847 A1 | 5/2010 | Evans et al. | |
| 2010/0138701 A1 | 6/2010 | Costantino | |
| 2010/0174446 A1 | 7/2010 | Andreasen et al. | |
| 2010/0205450 A1 | 8/2010 | Sarnacke et al. | |
| 2010/0220113 A1 | 9/2010 | Kennedy | |
| 2010/0256861 A1 | 10/2010 | Hodges | |
| 2010/0256864 A1 | 10/2010 | Ying | |
| 2010/0293081 A1 | 11/2010 | Liu et al. | |
| 2011/0055763 A1 | 3/2011 | Utsuki et al. | |
| 2011/0071720 A1 | 3/2011 | Schondorf et al. | |
| 2011/0141921 A1 | 6/2011 | Reese et al. | |
| 2011/0276219 A1 | 11/2011 | Swaminathan et al. | |
| 2011/0288954 A1 | 11/2011 | Bertosa et al. | |
| 2012/0044086 A1 | 2/2012 | Ruther et al. | |
| 2012/0313771 A1 | 12/2012 | Wittliff, III | |
| 2012/0324075 A1 | 12/2012 | Bertosa et al. | |
| 2013/0041553 A1 | 2/2013 | Bertosa et al. | |

OTHER PUBLICATIONS

International Search Report and Written Opinion for PCT/US12/12341, mailed Sep. 28, 212 (Previously presented with the parent U.S. Appl. No. 13/195,386).

Search Report dated Dec. 3, 2013 for PCT/US13/057920 filed Sep. 4, 2013 (Previously presented with the priority application U.S. Appl. No. 12/986,559).

International Search Report and Written Opinion dated Sep. 28, 2012 for PCT/US12/12341 (Previously presented with the priority application U.S. Appl. No. 12/986,559).

Search Report for European Patent Application No. 11160597.8 dated Aug. 5, 2011 (Previously present with the priority application U.S. Appl. No. 12/986,559).

International Search Report for PCT/US2013/057920 dated Dec. 6, 2013.

International Search Report mailed Nov. 14, 2014 for PCT/US2014/048842 filed Jul. 30, 2014.

International Search Report dated Aug. 7, 2014 for PCT/US2014/030351; filed Mar. 17, 2014.

Supplementary European search report and the European search opinion dated Mar. 17, 2015.

U.S. Office Action dated Jun. 25, 2015, in U.S. Appl. No. 13/606,755.

* cited by examiner

METHOD AND APPARATUS FOR IDENTIFYING RELATED FIX INFORMATION AND PARTS NUMBER

CROSS-REFERENCE TO RELATED APPLICATIONS

The present application is a continuation of Ser. No. 13/195,386, filed Aug. 1, 2011, now patented U.S. Pat. No. 8,600,610, issued Dec. 3, 2013, which is a continuation in part and claims priority to pending U.S. patent application Ser. No. 12/986,559, filed Jan. 7, 2011, entitled "CODE CONNECT INFORMATION ACCESS," which claims priority to U.S. Provisional Application No. 61/319,602, filed Mar. 31, 2010, entitled "CODE CONNECT INFORMATION ACCESS," the disclosures of which are hereby incorporated by reference in their entirety.

FIELD OF THE INVENTION

The present invention relates generally to an automotive diagnostic tool. More particularly, the present invention relates to an apparatus and method that obtain additional information such as top reported fixes and part numbers that are available for a fault code in a vehicle.

BACKGROUND OF THE INVENTION

Modern vehicles typically have one or more diagnostic systems, generally having separate computer control modules, such as an electronic control unit (ECU) to control various functions of the vehicle. Some examples include a powertrain control module (PCM), an engine control module (ECM), a transmission control module (TCM), an anti-locking brake system (ABS), and supplemental restraint system module (SRS). The vehicle diagnostic systems, such as OBD II (On-Board Diagnostic) have self-diagnostic capabilities to detect and alert the driver of problems that the vehicle may be encountering. When a problem is detected, a diagnostic trouble code (DTC) is set within the module's memory. DTCs are as general or as specific as the manufacturer desires for a particular vehicle.

To retrieve and decipher DTCs, an auto repair technician needs a diagnostic tool, such as a scan tool. The diagnostic tool is connected to the OBD II via a data link connector (DLC) to access and retrieve the DTCs. Diagnostic tools are equipped to communicate in various communication protocols used in the vehicle such as Controller Area Network (CAN), J1850 VPM and PWM, ISO 9141, Keyword 2000 and others. These communication protocols may be specific to each of the various vehicle manufacturers. The diagnostic tool will help the technician to diagnose and repair the vehicle based on the information the tool retrieves from the vehicle.

The diagnostic tools have limited and dated diagnostic information in their database stored on the diagnostic tool. Accordingly, it is desirable to provide a method and apparatus that allow a diagnostic tool to have the most up to date diagnostic information available in order to provide accurate diagnoses of the vehicle and to identify the part numbers that may be at fault.

SUMMARY OF THE INVENTION

The foregoing needs are met, to a great extent, by the present invention, wherein in one aspect an apparatus, such as a diagnostic tool, is provided that in some embodiments allows the diagnostic tool to indicate via an indicator on a display when additional information is available based on the DTCs retrieved from the vehicle and also to identify the parts numbers of faulty parts associated with the DTCs.

The foregoing needs are met, to a great extent, by one or more embodiments of the present invention. According to one such embodiment, a diagnostic tool for diagnosing a vehicle is provided, which can include a processor that can control functions of the diagnostic tool and can retrieve diagnostic trouble code (DTC) from the vehicle, a memory that may store a software to operate the diagnostic tool, the memory can communicate with the processor, a connector interface that can connect the diagnostic tool to the vehicle, the connector interface can communicate with the processor, a signal translator that may allow the diagnostic tool to communicate with the vehicle in at least one communication protocol, the signal translator can communicate with the processor; and a wireless communication port that may communicate with a remote device and a remotely located parts database, wherein the processor may access a part information stored on the remotely located parts database and use the part information to identify a first faulty part and a first faulty part number based on the retrieved DTC, and wherein the processor may communicate with the remote device to search for the part at a parts supplier.

In accordance with another embodiment of the present invention, a diagnostic tool for diagnosing a vehicle is provided, which can include a processor that may control functions of the diagnostic tool and may retrieve diagnostic trouble code (DTC) from the vehicle, a memory that can store a software to operate the diagnostic tool and a database of diagnostic data, the memory may communicate with the processor, a connector interface that may connect the diagnostic tool to the vehicle, the connector interface may communicate with the processor, a signal translator that may allow the diagnostic tool to communicate with the vehicle in at least one communication protocol, the signal translator may communicate with the processor, and a wireless communication port that communicates with a remote device and a remotely located parts database, the wireless communication port receives a part information stored on the remotely located parts database and transmits it to the processor, which uses the part information to identify a first faulty part and a first faulty part number based on the retrieved DTC, and wherein the processor accesses the remote device to search for the part at a parts supplier.

In accordance with yet another embodiment of the present invention, a method of identifying a part of a vehicle using a diagnostic tool is provided, which can include retrieving a diagnostic trouble code (DTC) from the vehicle with the diagnostic tool, inputting the vehicle's information into the diagnostic tool with an input device of the diagnostic tool, searching a remotely located parts database with a processor of the diagnostic tool to determine a faulty part and faulty part number based on the retrieved DTC, and displaying the faulty part number on a display.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides an apparatus, such as a diagnostic tool and method that allow a diagnostic tool to indicate on a display that additional information is available based on retrieved diagnostic information such DTCs in a vehicle. In other embodiments, the diagnostic tool not only provides additional diagnostic information but also identifies the potentially defective parts and their corresponding part numbers based on the retrieved DTCs, where the replacement parts are located, and pricing.

Figure 1:
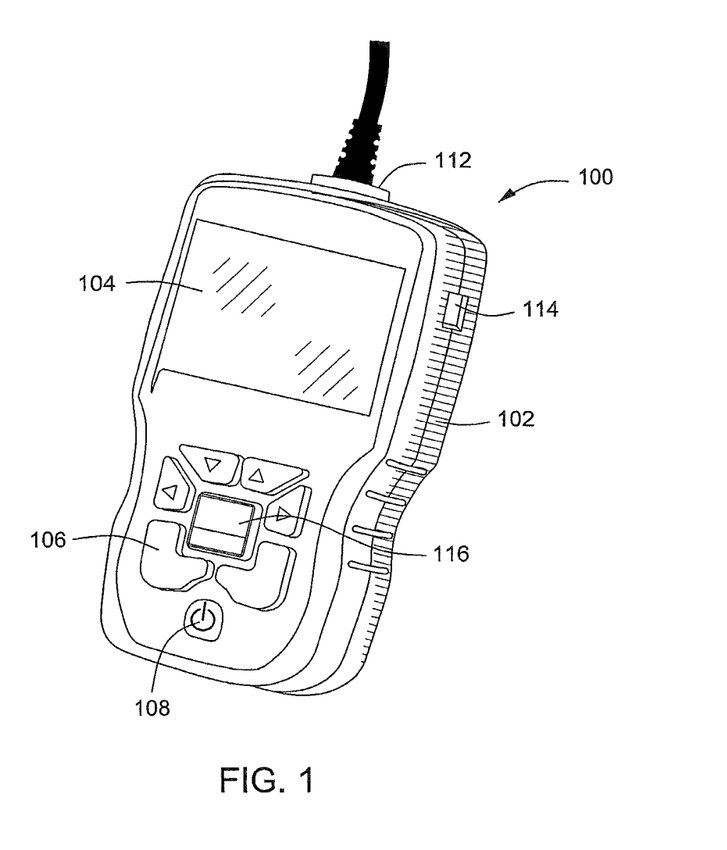
FIG. 1 is a plan view illustrating a diagnostic tool according to an embodiment of the invention.

An embodiment of the present inventive apparatus is illustrated in FIG. 1. In particular, FIG. 1 is a plan view illustrating a diagnostic tool 100 according to an embodiment of the invention. The diagnostic tool 100 can be any computing device, such as the CP9580 diagnostic tool from Service Solutions (a unit of the SPX Corporation) in Warren, Mich. The diagnostic tool 100 includes a housing 102 to house the various components of the diagnostic tool, such as a display 104, a user interface 106, a power key 108, a memory card reader (optional), a connector interface 112 and a connection 114.

The display 104 can be any type of display, for example, a liquid crystal display (LCD), a video graphics array (VGA), a touch display (which can also be a user interface), etc. The display can turn OFF after a certain period of time that the tool is not being used. For example, when no buttons are pressed or no data is being retrieved from the vehicle for ten minutes, five minutes, three minutes or 1 minute. However, any time period can be set for turning OFF the display so that the battery (internal) can be conserved.

In one embodiment, the display can be tested to ensure that each "pixel" of the display is working properly. In one embodiment, each "pixel" of the display can made to display a solid color, such as black, red, grey or other colors or a combination thereof. In another embodiment, the screen can switch back and forth from the solid color screen and a screen that has text there on, such as a start screen. These embodiments help the user to see if there are any pixels that are not working properly.

The user interface 106 allows the user to interact with the diagnostic tool 100 in order to operate the diagnostic tool as desired. The user interface 106 can include function keys, arrow keys or any other type of keys that can manipulate the diagnostic tool 100 in order to operate various menus that are presented on the display. In one embodiment, the diagnostic tool 100 can include a keypad test to determine if the keys are working properly. The key or scroll direction being pressed will inverse colors on the display. If the colors do not inverse, then the key is not working properly. Other embodiments can include tests that include sound, vibrations and the like to indicate if the keys are working properly.

The keys can also include a "back" or "enter" or a "code connect" 116 key. Once activated, the code connect 116 can display additional information about a DTC including defective parts associated with the DTC or other diagnostic information as discussed herein. The input device 106 can also be a mouse or any other suitable input device, including a keypad, or a scanner. The user interface 106 can also include numbers or be alphanumeric.

The power key 108 allows the user to turn the diagnostic tool 100 ON and OFF, as required. The diagnostic tool 100 can automatically turn OFF after a user-selectable period of time of inactivity (e.g. no buttons pressed or data being collected from the vehicle). The power for the diagnostic tool 100 can be supplied from internal batteries of the tool or from the vehicle's battery when the tool is coupled to the DLC or from a connection to a computing device, such as through a USB connection. If the power source is the vehicle or through a connection (such as a computing device), then the tool can power on automatically once the tool is connected to the vehicle or computing device.

Memory card reader (optional) can be a single type card reader, such as a compact flash card, floppy disc, memory stick, secure digital memory, flash memory or other types of memory. The memory card reader can be a reader that reads more than one of the aforementioned memory such as a combination memory card reader. Additionally, the memory card reader can also read any other computer readable medium, such as CD, DVD, UMD, etc. In one embodiment, the memory card reader can be used to update the software or databases that are in the diagnostic tool 100.

The connector interface 112 allows the diagnostic tool 100 to connect to an external device, such as an ECU of a vehicle, a computing device, an external communication device (such as a modem), a network, etc. through a wired or wireless connection (not shown). In addition, a connection 114 can also be included on the diagnostic tool 100 in order to connect to USB, FIREWIRE, modem, RS232, RS485, and other connections to communicate with external devices, such as a hard drive, USB drive, CD player, DVD player, UMD player, PC or other computer readable medium devices.

Figure 2:
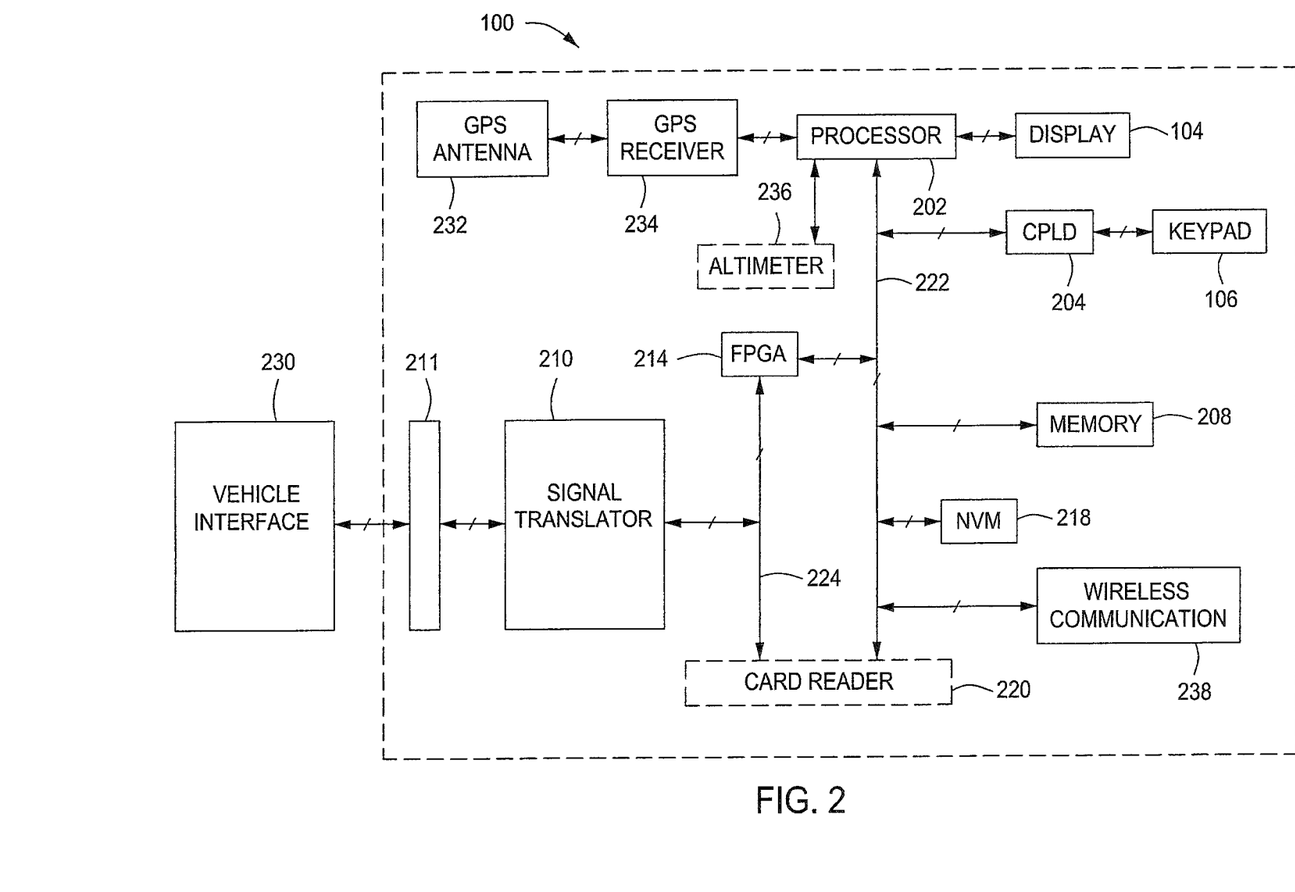
FIG. 2 is a block diagram of the components of the diagnostic tool of FIG. 1 according to an embodiment of the invention.

FIG. 2 is a block diagram of the components of the diagnostic tool 100. In FIG. 2, the diagnostic tool 100 according to an embodiment of the invention includes a processor 202, a field programmable gate array (FPGA) 214, a first system bus 224, the display 104, a complex programmable logic device (CPLD) 204, the user interface in the form of a keypad 106, a memory subsystem 208, an internal non-volatile memory (NVM) 218, a card reader 220 (optional), a second system bus 222, a connector interface 211, a selectable signal translator 210, a GPS antenna 232, a GPS receiver 234, an optional altimeter 236 and wireless communication circuit 238. A vehicle communication interface 230 is in communication with the diagnostic tool 100 through connector interface 211 via an external cable (not shown).

Selectable signal translator 210 communicates with the vehicle communication interface 230 through the connector interface 211. Signal translator 210 conditions signals received from an ECU unit through the vehicle communication interface 230 to a conditioned signal compatible with diagnostic tool 100. Signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), Controller Area Network (CAN), Keyword 2000 (ISO 14230-4), OBD II or other communication protocols that are implemented in a vehicle.

The circuitry to translate and send in a particular communication protocol can be selected by FPGA 214 (e.g., by tri-stating unused transceivers) or by providing a keying device that plugs into the connector interface 211 that is provided by diagnostic tool 100 to connect diagnostic tool 100 to the vehicle communication interface 230. Signal translator 210 is also coupled to FPGA 214 and the card reader 220 via the first system bus 224. FPGA 214 transmits to and receives signals (i.e., messages) from the ECU unit through signal translator 210.

The FPGA 214 is coupled to the processor 202 through various address, data and control lines by the second system bus 222. FPGA 214 is also coupled to the card reader 220 through the first system bus 224. The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of the diagnostic tool 100 and also provides glue-logic for various other interfacing tasks.

Memory subsystem 208 and internal non-volatile memory 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software to run the diagnostic tool 100 can be stored in the memory subsystem 208 or non-volatile memory 218, including any database. The database can include diagnostic information and other information related to vehicles.

In one embodiment, the database can include additional information such as possible fixes for a particular DTC retrieved from a vehicle and the associated parts number that could be defective based on the retrieved DTC. A parts database stored on the diagnostic tool or remotely can be used to identify the potentially defective parts and their numbers based on the retrieved DTCs. Various parts in a vehicle that can cause DTCs to be set in the ECUs are associated with each available DTCs. One defective part or a combination of parts can cause one or more DTC to be set in the ECU. Thus, the parts database will contain all the possible combinations of parts for a DTC or a set of DTCs.

The search of the parts database will proceed faster if the vehicle identification information for the vehicle under test is entered into the diagnostic tool so that the search is limited to the parts of the entered vehicle (or device). The vehicle identification information can include the VIN (vehicle identification number), make, model, year or other vehicle identifiable characteristics (hybrid, electric, etc.). Other search parameters can be used to narrow down the search such as major categories such as transmission, brake, interior, exterior, etc. Once the search identifies the part(s) associated with the retrieved DTCs, the information related to the part can be displayed on a display screen of the diagnostic tool (other computing device) for verification by the technician. The information can include the part's number, bar code information, images of the parts, diagrams on how to remove and replace the part, diagrams on where the part is located on the vehicle, manuals for the part, technical information of the parts, warranty information, OEM (original equipment manufacturer) equivalent parts, etc.

In another embodiment, a bar code information (via a bar code reader) can be sent to a mobile device (such as a smart phone) of the technician so that he can simply take the bar code information to a parts store and have the clerk scan the bar code on the mobile device in order to purchase the correct parts. Further, once properly identified, additional information such as parts availability, pricing, location, etc. can be retrieved as discussed herein.

The database can contain information about additional databases include the additional information about the parts. The additional databases can be in a remote location instead of being local on the diagnostic tool. The remote database can be accessed via a wireless or wired connection as discussed herein. The database can also be stored on an external memory, such as a compact flash card or other memories and accessed locally by the diagnostic tool.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

The GPS antenna 232 and GPS receiver 234 may be mounted in or on the housing 102 or any combination thereof. The GPS antenna 232 electronically couples to the GPS receiver 234 and allows the GPS receiver to communicate (detects and decodes signals) with various satellites that orbit the Earth. In one embodiment, the GPS antenna and GPS receiver are one device instead of two. The GPS receiver 234 and GPS antenna 232 electronically couple to the processor 202, which is coupled to memory 208, NVM 218 or a memory card in the card reader 220. The memory can be used to store cartographic data, such as electronic maps. The diagnostic tool can include all the maps for the U.S. (or country of use), North America or can have the region or state where the diagnostic tool is located. In alternative embodiments, the diagnostic tool can have all the maps of the world or any portion of the world desired by the user. This allows the diagnostic tool to be a GPS device so that a driver can drive from one location to another. The maps may be over layed or incorporated with traffic, local events, and location of other GPS devices (smart phones) and other information that can be useful to the technician. By being able to locate other diagnostic tools with GPS, then the technicians may be able to use the diagnostic tools to locate each other in order to conduct a meeting or have a social event.

The GPS receiver communicates with and "locks on" to a certain number of satellites in order to have a "fix" on its global location. Once the location is fixed, the GPS receiver, with the help of the processor, can determine the exact location including longitude, latitude, altitude, velocity of movement and other navigational data of the diagnostic tool 100.

Should the GPS receiver be unable to lock onto the minimum number of satellites to determine the altitude or unable to determine the altitude for any reason, the altimeter 236 can be used to determine the altitude of the diagnostic tool 100. The altimeter 236 is electronically coupled to the processor 202 and can provide the altitude or elevation of the diagnostic tool 100. The altimeter can be coupled to a barometric pressure sensor (not shown) in order to calibrate the elevation measurements determined by the altimeter. The sensor can be positioned interior or exterior to the housing 102 of the diagnostic tool 100. Minor atmospheric pressure changes can affect the accuracy of the altimeter, thus, diagnostic tool can correct for these changes by using the sensor in conjunction with the altimeter along with a correction factor known in the art.

Figure 5:
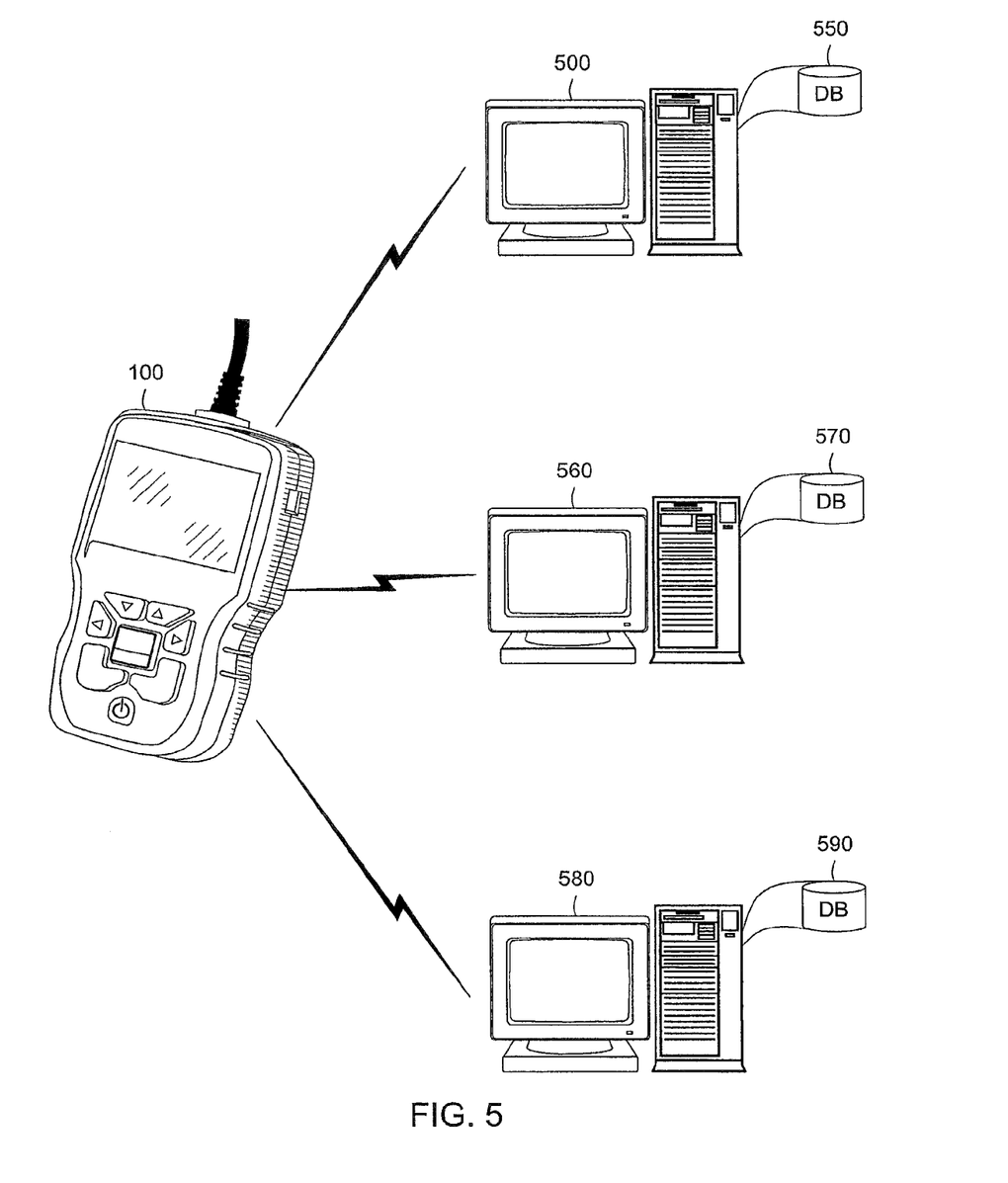
FIG. 5 illustrates the diagnostic tool communicating with a remote device having the additional information according to another embodiment of the invention.

Wireless communication circuit 238 communicates with the processor 202 via the second bus system 222. The wireless communication circuit can be configured to communicate via RF (radio frequency), satellites, cellular phones (analog or digital), Bluetooth®, Wi-Fi, Infrared, Zigby, Local Area Networks (LAN), WLAN (Wireless Local Area Network), other wireless communication configurations and standards or a combination thereof. The wireless communication circuit 238 allows the diagnostic tool 100 to communicate with other devices wirelessly such as with a remote computing device 500 (FIG. 5) having remote databases. In one embodiment, the remote database includes the parts database and/or the top fixes database 550 (FIG. 5). The wireless communication circuit includes an antenna built therein and being housed within the housing or can be externally located on the housing.

A diagnostic tool program is needed to operate the diagnostic tool to perform the various diagnostic tests. Different vehicle manufacturers (or even within the same manufacturer) require the diagnostic tool to operate using different programs and communication protocols. The vehicle information (make, model, year, etc.) may be inputted into the diagnostic tool through the user interface 106 in a manner such as, for example, scanning a bar coded VIN number located on the vehicle to be serviced or inputting information of the vehicle, such as year, make and model. In another embodiment, the diagnostic tool can automatically scan for the vehicle information, for example information from the ECUs of the vehicle, to determine the correct vehicle or communication protocol used by the vehicle.

Once the diagnostic tool program is operating and the diagnostic tool is connected to the DLC, the DTCs and other diagnostic data can be retrieved from the vehicle. In one embodiment, the available vehicle diagnostic data can be automatically scan from the vehicle and displayed on the display. The display can include a list of data category (e.g., I/M monitors, DTCs, state OBD check, etc.) that can be available for that vehicle or a generic vehicle and a check mark or other indicators can be next to a category that has vehicle data retrieved from the vehicle. This allows the technician to hone in on the information that he wants or be able to quickly determine what diagnostic data is available for the vehicle under test.

Figure 3A:
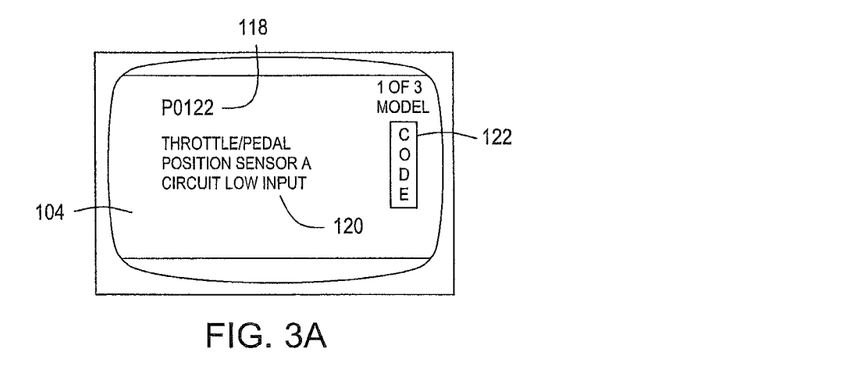
FIGS. 3A-C illustrate an indicator indicating that additional information is available according to an embodiment of the invention.
Figure 3B:
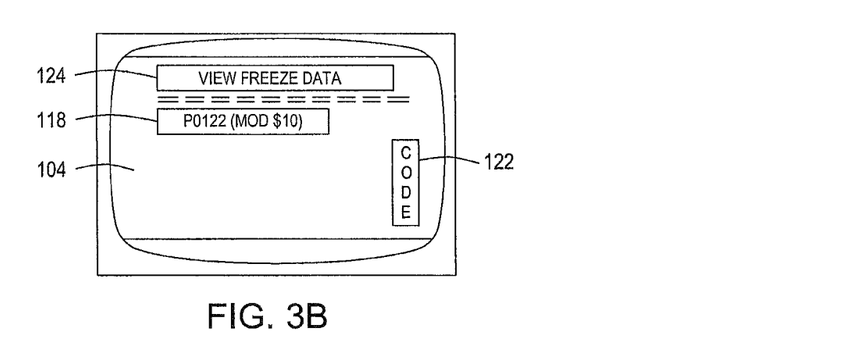
Figure 3C:
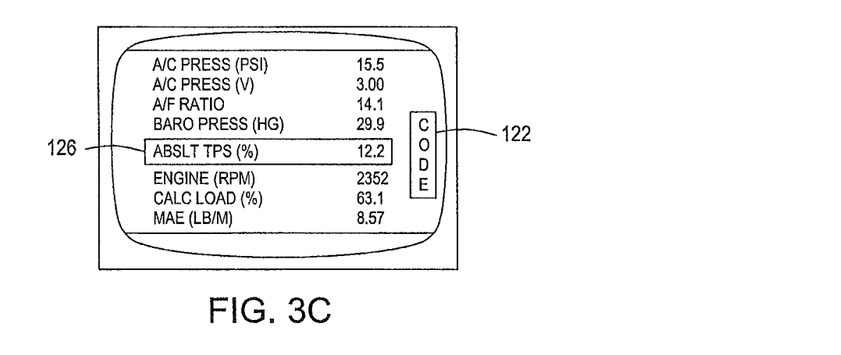

In another embodiment, FIGS. 3A-C illustrate an indicator 122 stating "code" indicating that additional information 128 (see FIGS. 4A-C) is available for a DTC 118. It should be noted that any type of indicator can be used, such as other words, symbols, LEDs, sound, vibrations, and the like can be used. The display 104 can display the DTCs received from the ECUs of the vehicle. In this example, the DTC 118 is P0122 and the corresponding text 120 indicates a fault "throttle/pedal position sensor a circuit low input." At this point, because the "code" indicator 122 is shown, the user can press the "code connect" button 116 on the user interface to retrieve additional information 128 about the DTC.

Figure 4A:
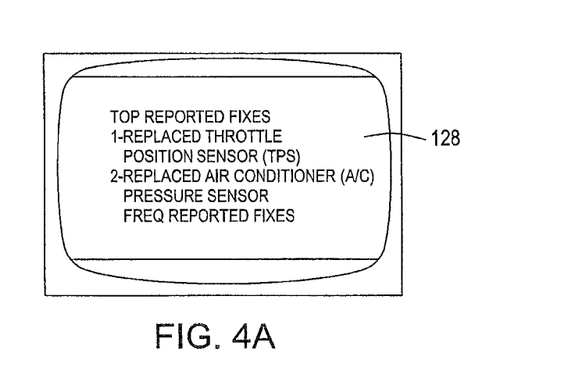
FIGS. 4A-C illustrate the additional information available for the DTC of FIG. 3A according to an embodiment of the invention.
Figure 4B:
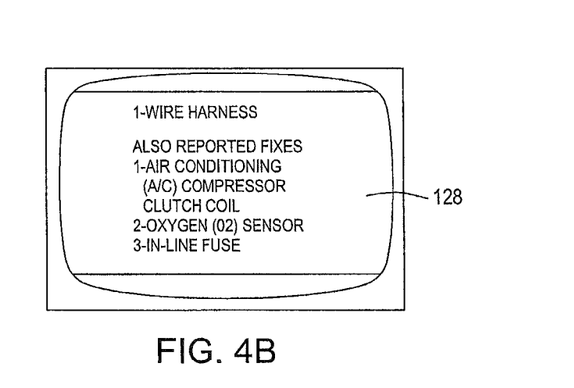
Figure 4C:
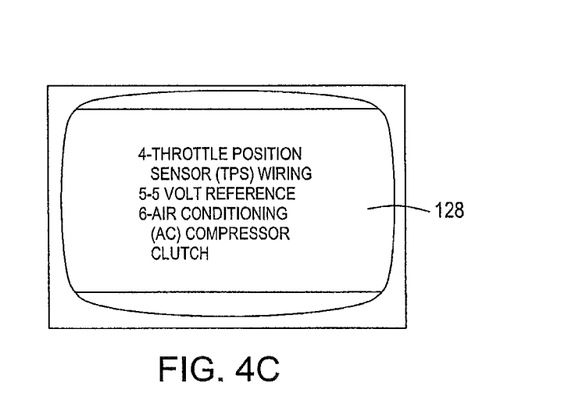

The additional information 128 includes repair information for that code and associated faulty parts information. The repair information may be specific to the vehicle under test or be related to any vehicle based the DTC code or other diagnostic information. The repair information can be based on previous repair experience for that DTC and provides various levels of reported fixes. The levels may include top reported fixes, frequently reported fix and other reported fixes. The repair information may be from Identifix™ located at 2714 Patton Road, St. Paul, Minn. 55113. The additional information 128 can be viewed at other times including during viewing freeze frame data or menu items and when the user sends codes to a PC. The additional information, if available, will also be printed out for the technician to use.

FIG. 3B illustrates the display 104 in the view freeze data 124 function of the tool 100. In this view, the DTC 118 is displayed along with the "code" indicator 120. In this embodiment, the indicator 122 indicates that additional information 128 is available for the DTC in the view freeze data 124 function.

FIG. 3C illustrates the display 104 while viewing the actual freeze frame data 126. In this mode or function, the "code" indicator 120 indicates a particular freeze frame data 126 has additional information 128 that can be retrieved from the database. These are but examples of the use of the indicator 122 in various modes of the tool 100. The use of the indicator 122 in other modes is also contemplated by the invention.

FIGS. 4A-C illustrate the additional information 128 available for the DTC of FIG. 3A according to an embodiment of the invention. The additional information 128 can be provided at various levels of reported fixes, such as top reported fixes, frequently reported fixes and other reported fixes. Top reported fixes can be the more likely to be the solution while frequently reported fixes can be as likely as a solution and also reported fixes are less likely than other solutions, but worth considering. Other levels of reported fixes are also contemplated by the invention. In order to view the various levels, the user can use the arrows on the user interface 106 to navigate the additional information 128 on the display 104. The additional information may be updated via a wired or wireless connection so that the technician will have the benefit for the most up to date information available to efficiently diagnose the issues with the vehicle.

FIG. 5 illustrates the tool 100 communicating with the remote computing devices 500, 560, 580 having the remote parts database and/or the top fixes database according to another embodiment of the invention. As previously stated, the tool 100 includes the ability to access the remote computing devices via a wired or wireless connection. In this embodiment, the tool 100 is wirelessly communicating with the remote computing device 500 that stores the parts database in the event the additional information is not stored locally on the diagnostic tool. In this embodiment, the parts database can be used to search for the correct part and parts number based on the retrieved DTCs.

The remote computing devices 500, 560, 580 can be located in the garage that the tool 100 is being used or located in another location such as another building, another part of the city, another city, county, state or country. The wireless connection can also be via a distributed network, such as the Internet.

In one embodiment, the remote computing devices 560, 580 may be parts suppliers computing devices that contain respective parts information databases or may be another party's computing device but are contracted for the parts suppliers. This includes cloud computing devices owned by another party (e.g. Apple or Amazon). The parts information can include pricing, warranty, availability, diagrams, manuals, delivery options including mailing and local delivery, and other parts information discussed herein. Thus, once the part(s) that needs replacement is identified, the parts supplier's computing devices 560, 580 that contain the parts databases 570, 590 (respectively) can be accessed to determine the price and availability of the part. The GPS location of the diagnostic tool can be used so that the nearest part supplier can be located with the part available for purchase and at the best price. This will save time and provide options so that the technician can choose to travel to the parts store to purchase the part, have the part delivered locally or shipped by interacting with a web site stored on the parts supplier's computing device, or simply place it on hold for pick up when desired. Additionally, other parts stores that have the part available can also be displayed so that the technician has a choice to go to other stores in the event he has to run other errands or is on the way home or returning back to work.

Figure 6:
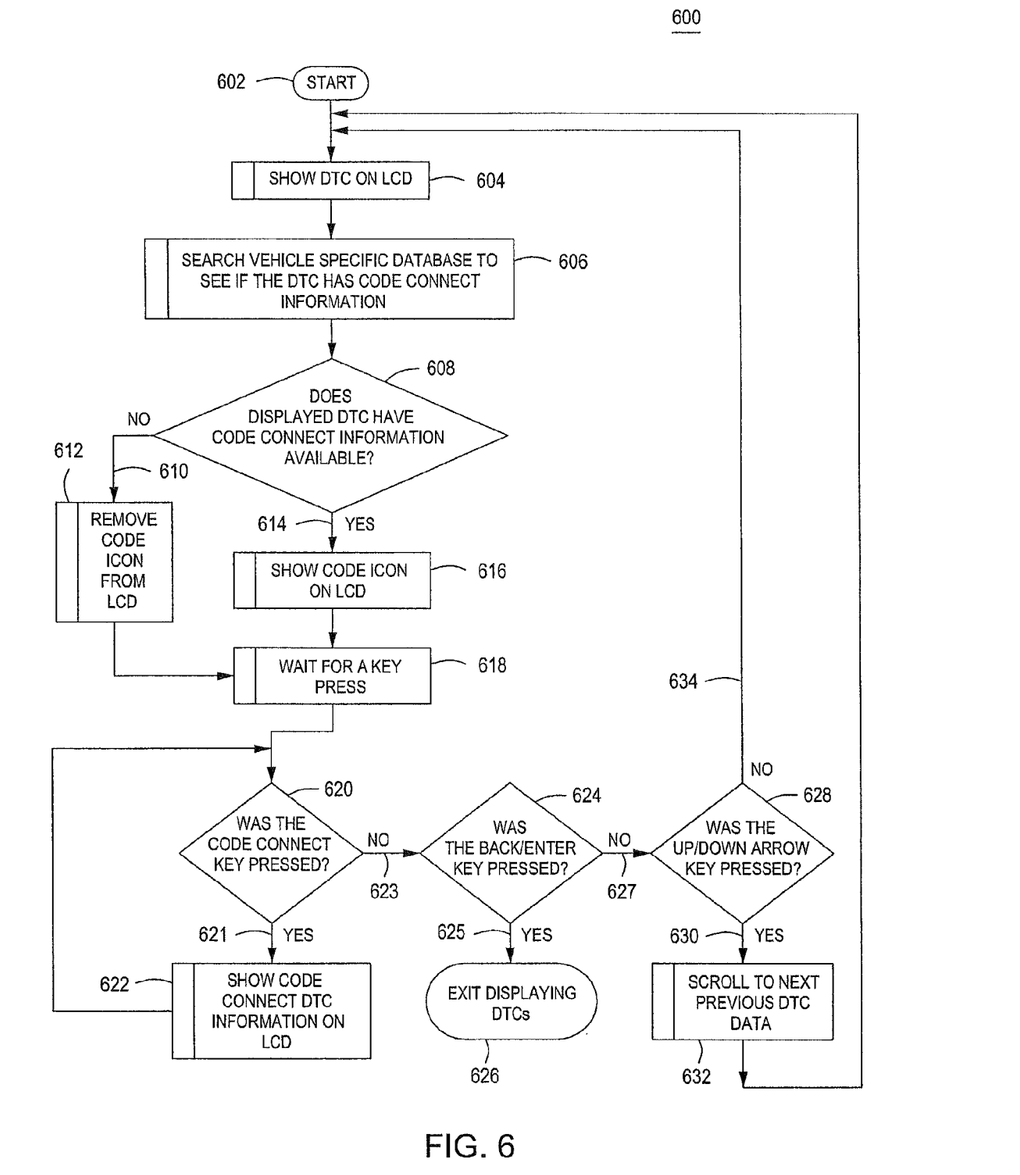
FIG. 6 illustrates a method to display the indicator according to an embodiment of the invention.

FIG. 6 illustrates a method 600 to display the indicator 122 according to an embodiment of the invention. The method 600 can be stored on a memory of tool 100 in the form of software and executed by the processor. At step 602, the method starts. At step 604, the DTC is retrieved from the vehicle and displayed. At step 606, a search of a vehicle specific database to determine if the DTC has additional information or "code connect" information. However, it is not necessary that it is vehicle specific as it could be based on the DTC itself or other diagnostic data. At step 608, a determination is made if the displayed DTC has additional information available. If no 610, then at step at 612, the "code" indicator is removed from the display, if displayed, and the method proceed to step 618. In other embodiments, the "code" indicator is not displayed. If yes 614, then at step 616, the "code" indicator is shown on the display 104. At step 618, wait for a key press by the user. At step 620, a determination is made on whether the "code connect" key is pressed (only if additional information is available). If yes 621, then at step 622, show additional information 128 on the display and then return to step 620. If no 623, then at step 624, determine if the "back/enter" key was pressed. If yes 625, then exit displaying the DTCs at step 626. If no 627, then at step 628 determine if the "up/down" arrow key was pressed. If yes 630, then at step 632 scroll to the next or previous DTC data and return to step 604 to see if other DTC has additional information available. If no 634, then return to step 604.

Figure 7:
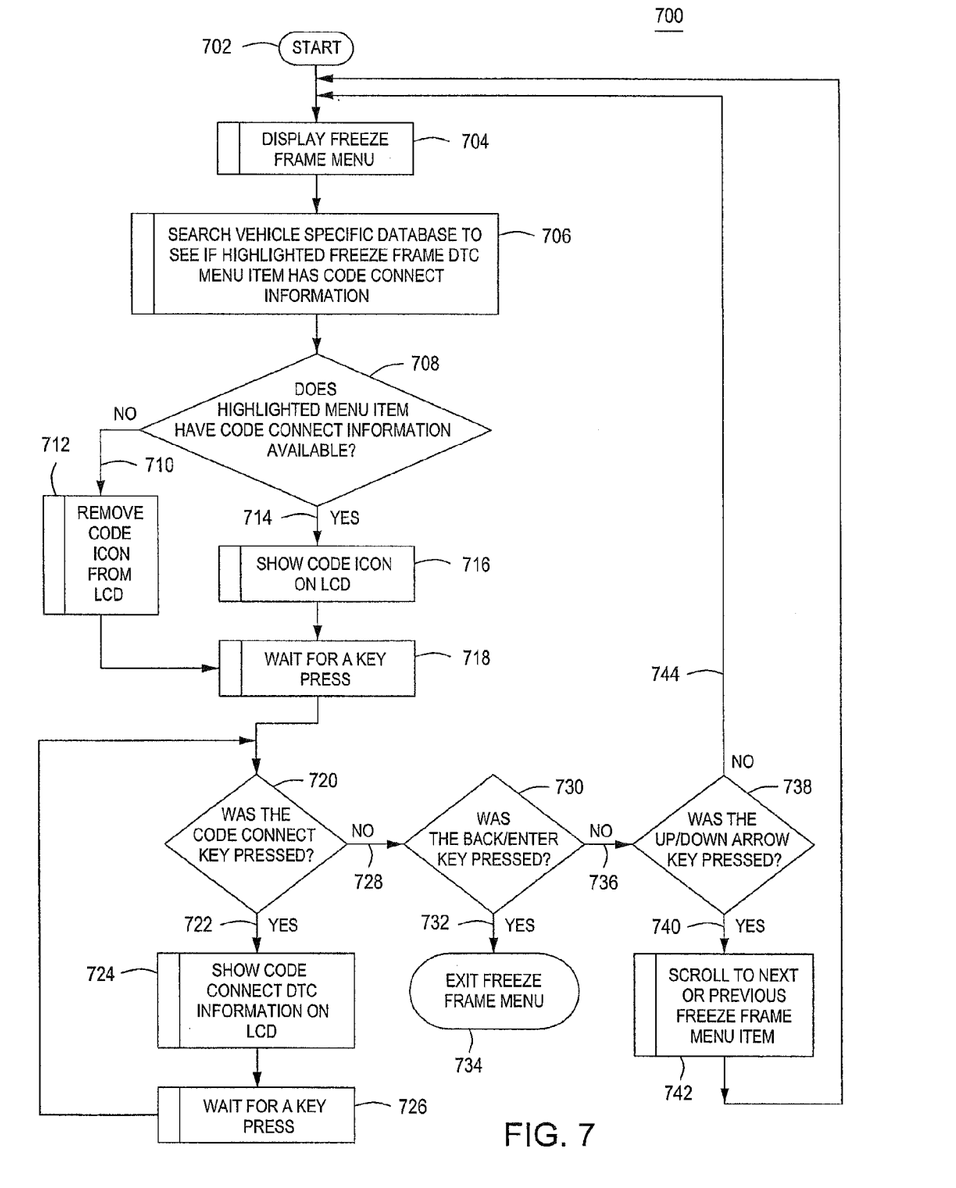
FIG. 7 illustrates a method to display an indicator at a freeze frame menu according to an embodiment of the invention.

FIG. 7 illustrates method 700 to display an indicator 122 at a freeze frame menu according to an embodiment of the invention. Method 700 starts at step 702. At step 704, the display displays the freeze frame menu. At step 706, search a vehicle specific database to determine if the highlighted freeze frame menu item has additional information or "code connect" information available. At step 708, determine if additional information is available for the highlighted menu item. If no 710, then remove "code" indicator 122 from the display 104, if displayed and proceed to step 718. In other embodiments, the "code" indicator is not displayed. If yes 714, then at step 716 show "code" indicator 122 on the display 104. At step 718, wait for the user to press a key. At step 720, determine if the "code connect" key was pressed (only if additional information is available) by the user. If yes 722, then at step 724, show additional information 128 on the display 104 and proceed to step 726 and wait for a key press at step 726 and return to step 720. If no 728, then at step 730 determine if the "back/enter" key was pressed. If yes 732, then exit freeze frame menu at step 734. If no 736, then at step 738 determine if the "up/down" arrow key was pressed. If yes 740, then at step 742 scroll to next or previous freeze frame menu item and proceed to step 704. If no 744, then return to step 704.

Figure 8:
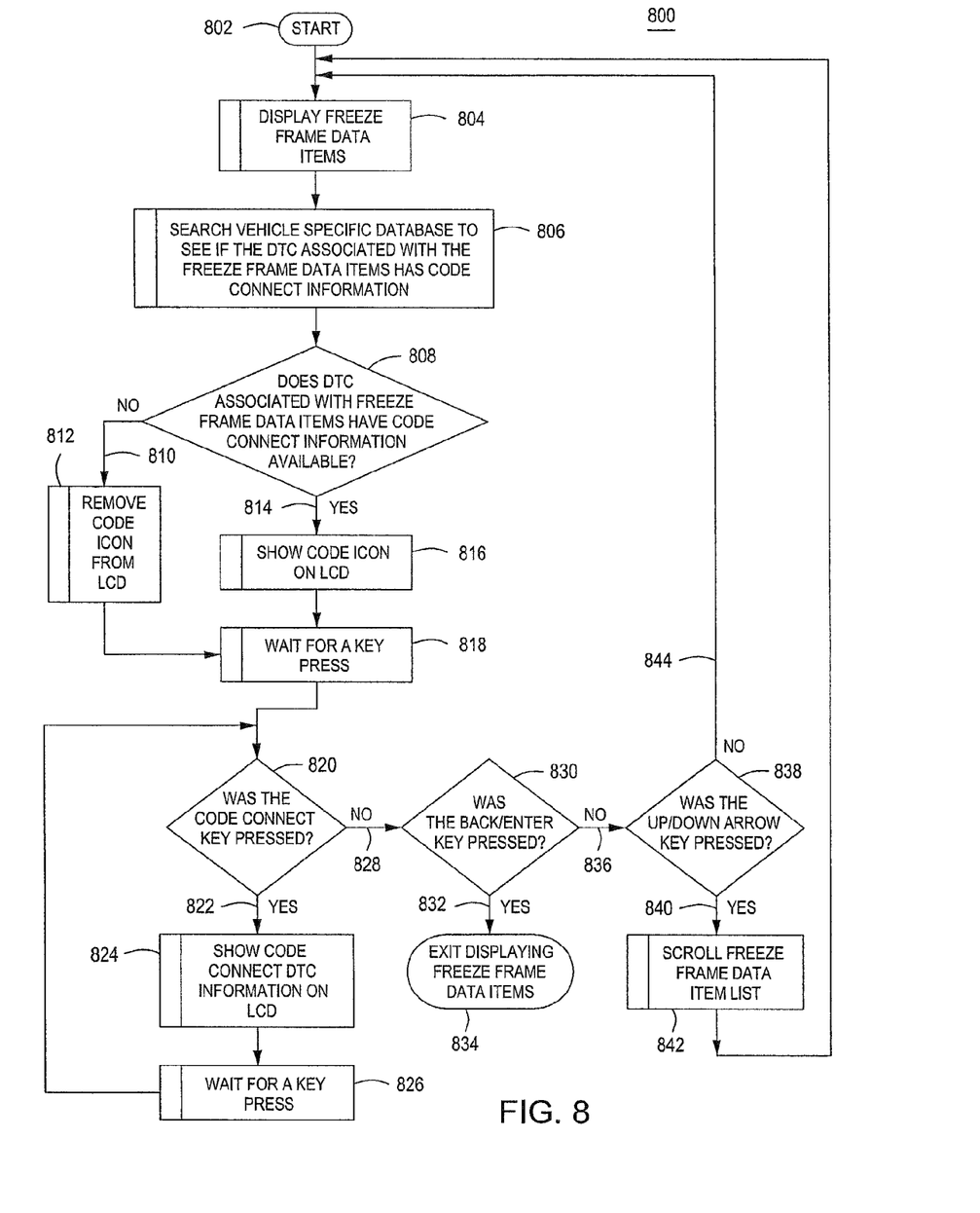
FIG. 8 illustrates a method to display an indicator at a freeze frame data item according to an embodiment of the invention.

FIG. 8 illustrates method 800 to display an indicator 122 at a freeze frame data item according to an embodiment of the invention. Method 800 starts at step 802. At step 804, the display displays the freeze frame data items. At step 806, search a vehicle specific database to determine if the DTC associated with the freeze frame data items has additional information or "code connect" information available. At step 808, determine if additional information is available for the DTC associated with freeze frame data items. If no 810, then remove "code" indicator 122, if present from the display 104 and proceed to step 818. In other embodiments, the "code" indicator is not displayed. If yes 814, then at step 816 show "code" indicator 122 on the display 104. At step 818, wait for the user to press a key. At step 820, determine if the "code connect" key was pressed (only if additional information is available) by the user. If yes 822, then at step 824, show additional information 128 on the display 104 and proceed to step 826 and wait for a key press at step 826 and return to step 820. If no 828, then at step 830 determine if the "back/enter" key was pressed. If yes 832, then exit displaying freeze frame data items at step 834. If no 836, then at step 838 determine if the "up/down" arrow key was pressed. If yes 840, then at step 842 scroll freeze frame data item list and return to step 804. If no 844, then return to step 804.

Although examples of various embodiments of the invention include indicating that additional information is available based on a retrieved DTC, the additional information could also be associated with any retrieved diagnostic information from the vehicle. One example is diagnostic information of a throttle or a sensor. Further, in another embodiment, the diagnostic tool can automatically determining if additional diagnostic information is available and automatically displays the additional diagnostic information without further interaction by the technician.

Figure 9:
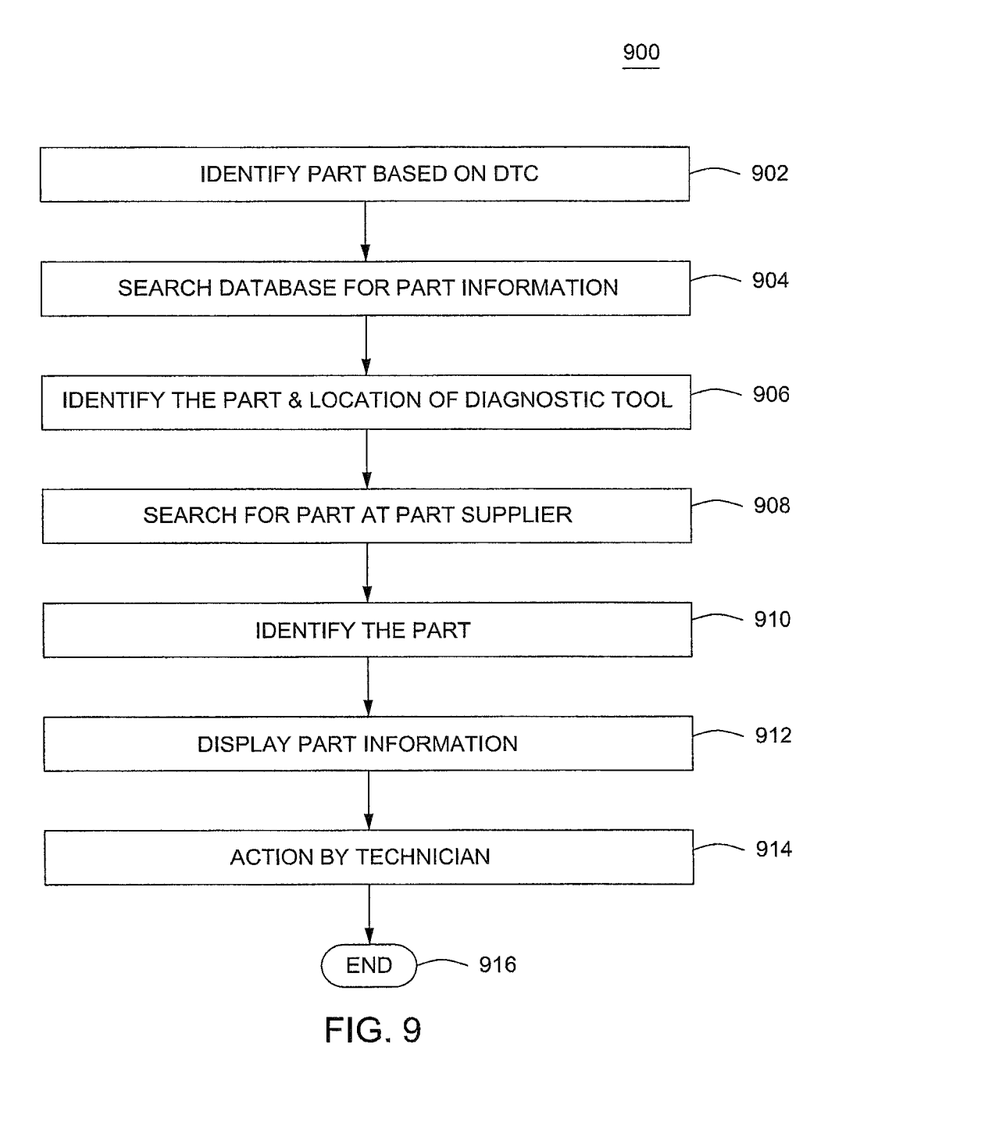
FIG. 9 illustrates a method of identifying parts information according to an embodiment of the invention.

FIG. 9 illustrates the steps of identifying and obtaining information for a part that needs to be replaced according to an embodiment of the invention. The method of identifying and obtaining information about the part 900 starts at step 902. At step 902, identify the part or parts based on the DTCs retrieved from the vehicle under test. A database of parts that can trigger a DTC is provided in this invention. Each part associated with a DTC is contained in the parts database. A DTC can also have many parts associated with it. At step 904, a search of the part is conducted using a parts database. The parts database can be located on the diagnostic tool 100 or on a remote computing device 500, 560, 580, or a combination thereof. At step 906, the diagnostic tool and/or the remote computing device 500 can identify the part and provide the part information such as the part number, the number of the part that would be needed to be replaced or other part identifying characteristics. The part number information can be Dorman Throttle Position Sensor 911-753 for 1994-1997 Honda Civic Del Sol JCW872950. The part information can include the OEM's and any equivalent generic part numbers. Also at step 906, the indirect location of the technician determined based on the GPS coordinate of the diagnostic tool 100 using the tool's GPS components.

At step 908, the diagnostic tool or the computing device 500 can communicate with the parts suppliers' computing devices 560, 580 to search for the part. The diagnostic tool 100 can provide information such as the vehicle VIN or make, model and year and the faulty part characteristics. At step 910, the part is identified based on the information sent to the part suppliers' computing devices. At step 912, the part information can be displayed to the technician on a display of the diagnostic tool 100 or remote computing device 500. The part number information displayed can be Dorman Throttle Position Sensor 911-753 for 1994-1997 Honda Civic Del Sol JCW872950. The part information displayed can also include pricing (costs, retail, discounted, etc.), availability including the location of the parts and if not available, alternative locations of the part or when the part is expected to be available and if there are alternatives (generic parts) that are available for the original equipment manufacture's part. At step 914, the technician can take action depending on the information displayed to him including ordering and purchasing the part to be delivered (if locally available) or shipped, or placing the part on hold for pickup at a later time and other actions. Alternatively, the technician can take no action based on the information provided or any other reason. The method ends at step 916.

The many features and advantages of the invention are apparent from the detailed specification, and thus, it is intended by the appended claims to cover all such features and advantages of the invention which fall within the true spirit and scope of the invention. Further, because numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for diagnosing a vehicle, comprising:
    a processor to control functions of the diagnostic tool and retrieve diagnostic trouble code (DTC) from the vehicle;
    a memory that stores software to operate the diagnostic tool and a database of diagnostic information and vehicle parts, the memory communicates with the processor;
    a connector interface that connects the diagnostic tool to the vehicle, the connector interface communicates with the processor;
    a signal translator that allows the diagnostic tool to communicate with the vehicle in at least one communication protocol, the signal translator communicates with the processor;
    a display to display information to a user, wherein the display is configured to display an indicator if additional diagnostic information in the memory is available for the retrieved DTC;
    an input device that includes a button that retrieves the additional diagnostic information when the indicator is present; and
    a wireless communication port that communicates with a remote device having remotely located parts database, wherein the processor accesses a part information stored on the remotely located parts database and use the part information to identify a first faulty part and a first faulty part number based on the retrieved DTC, and wherein the processor with the remote device to search searches for the first faulty part at a parts supplier.

2. The tool of claim 1, wherein the additional diagnostic information include suggested fixes that are based on previous successful diagnose of a symptom that caused the DTC in the vehicle.

3. The tool of claim 1, wherein the processor further accesses the part information stored on the remotely located parts database and use the part information to identify a second faulty part and a second faulty part number based on the retrieved DTC.

4. The tool of claim 1, wherein the processor accesses the part information stored on the remotely located parts database and use the part information to identify the first faulty part and the first faulty part number based on the retrieved DTC and on a vehicle identification number of the vehicle entered in the input device.

5. The tool of claim 1, wherein the processor accesses the part information stored on the remotely located parts database and use the part information to identify the first faulty part and the first faulty part number based on the retrieved DTC and on a category of the faulty part entered in the input device.

6. The tool of claim 1, wherein the identified first faulty part and first faulty part number information are forwarded to a mobile device.

7. The tool of claim 1 further comprising:
    a global positioning system (GPS) that determines a location of the diagnostic tool, wherein the GPS is used to determine a location of a nearest part supplier to the diagnostic tool.

8. The tool of claim 1, wherein the faulty part number includes an original equipment manufacturer's number and any equivalent generic part manufacturer's number.

9. A diagnostic tool for diagnosing a vehicle, comprising:
    a processor to control functions of the diagnostic tool and retrieve diagnostic trouble code (DTC) from the vehicle;
    a memory that stores software to operate the diagnostic tool and a database of diagnostic data and parts, the memory communicates with the processor;
    a connector interface that connects the diagnostic tool to the vehicle, the connector interface communicates with the processor;
    a signal translator that allows the diagnostic tool to communicate with the vehicle in at least one communication protocol, the signal translator communicates with the processor;
    a display to display information to a user, wherein the display is configured to display an indicator if additional diagnostic information is available in the memory for the retrieved DTC;
    an input device that includes a button that retrieves the additional diagnostic information when the indicator is present; and
    a wireless communication port that communicates with a remote device having a remotely located parts database, the wireless communication port receives a part information stored on the remotely located parts database and transmits it to the processor, which uses the part information to identify a first faulty part and a first faulty part number based on the retrieved DTC, and wherein the processor searches for the first faulty part at a parts supplier.

10. The tool of claim 9, wherein the additional diagnostic information include suggested fixes that are based on previous successful diagnose of a symptom that caused the DTC in the vehicle.

11. The tool of claim 9, wherein the processor further accesses the part information stored on the remotely located parts database and use the part information to identify a second faulty part and a second faulty part number based on the retrieved DTC.

12. The tool of claim 9, wherein the processor accesses the part information stored on the remotely located parts database and use the part information to identify the first faulty part and the first faulty part number based on the retrieved DTC and on a vehicle identification number of the vehicle entered in the input device.

13. The tool of claim 9, wherein the processor accesses the part information stored on the remotely located parts database and use the part information to identify the first faulty part and the first faulty part number based on the retrieved DTC and on a category of the faulty part entered in the input device.

14. The tool of claim 9, wherein the identified first faulty part and first faulty part number information is forwarded to a mobile device.

15. The tool of claim 9 further comprising:
a global positioning system (GPS) that determines a location of the diagnostic tool, wherein the GPS is used to determine a location of a nearest part supplier to the diagnostic tool.

16. The tool of claim 9, wherein the faulty part number includes an original equipment manufacturer's number and any equivalent generic part manufacturer's number.

17. A method of identifying a part of a vehicle using a diagnostic tool, comprising the steps of:
retrieving a diagnostic trouble code (DTC) from the vehicle with the diagnostic tool;
indicating on a display of the diagnostic tool if additional diagnostic information stored on a memory of the diagnostic tool is available for the retrieved DTC;
inputting the vehicle's information into the diagnostic tool with an input device of the diagnostic tool;
retrieving the additional diagnostic information when a button on the input device is pressed;
searching a remotely located parts database with a processor of the diagnostic tool to determine a faulty part and faulty part number based on the retrieved DTC; and
displaying the faulty part number on a display.

18. The method of claim 17, wherein the searching the parts database includes searching for an original equipment manufacturer's number and any equivalent generic part manufacturer's number.

\* \* \* \* \*